United States Patent [19]

Silverman et al.

[11] Patent Number: 4,910,823
[45] Date of Patent: Mar. 27, 1990

[54] CLEANING MECHANISM FOR PENETRATION INTERFACES IN NUCLEAR PRESSURE VESSELS

[75] Inventors: Eugene B. Silverman, Ellicott City; Richard K. Simmons, Perry Hall, both of Md.; Steve K. Hamilton, Long Beach, N.C.

[73] Assignee: Advanced Resource Development Corporation, Columbia, Md.

[21] Appl. No.: 186,865

[22] Filed: Apr. 27, 1988

[51] Int. Cl.$^4$ .......................... B08B 3/00; B08B 5/00
[52] U.S. Cl. .......................................... 15/1; 15/1.7;
15/3; 15/88; 134/102; 376/316
[58] Field of Search ...................... 15/1, 3, 88, 104.04,
15/1.7; 134/102; 166 R, 169 R; 376/316

[56] References Cited

U.S. PATENT DOCUMENTS 4,762,671 8/1988 Kobayashi et al. ................. 376/316

FOREIGN PATENT DOCUMENTS 2163999 7/1987 Japan ..................................... 15/1.7

Primary Examiner—Edward L. Roberts
Attorney, Agent, or Firm—Sughrue, Mion, Zinn, Macpeak & Seas

[57] ABSTRACT

A method and apparatus, comprising a tool having a clam shell design, for sealing the interface volume between the internal wall of a reactor pressure vessel and submerged piping that penetrates the wall, and for cleaning the interface volume using a series of hydraulic and pneumatic operations. The tool is operable from a remote suface location, using a robotic arm for fine positioning, to clamp around the penetrating pipe. Hydraulic nozzles compressed air and mechanical brushes on the tool may be used to dislodge sediment in the interface volume.

4 Claims, 5 Drawing Sheets

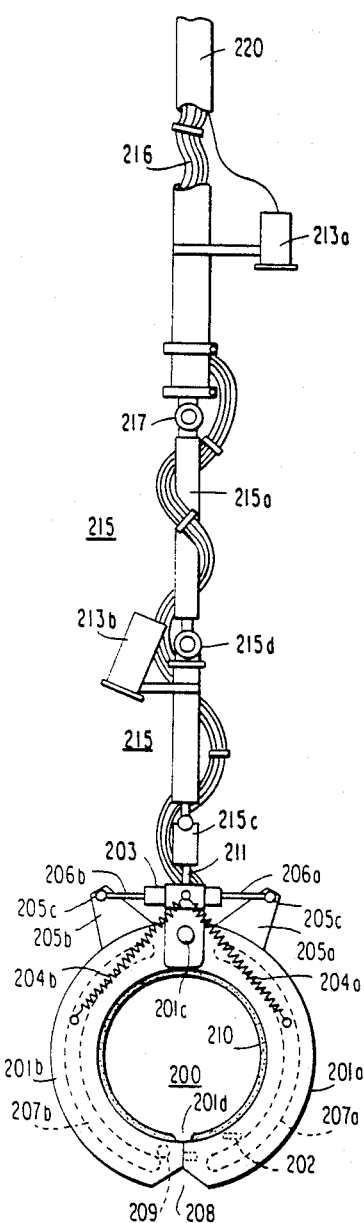
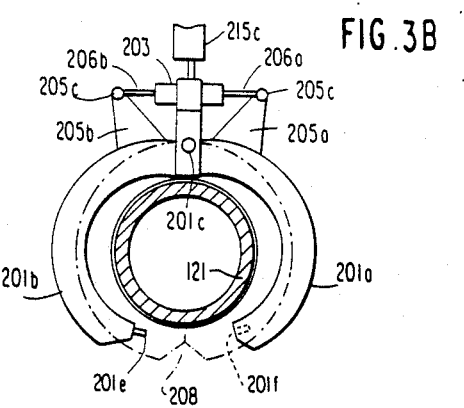
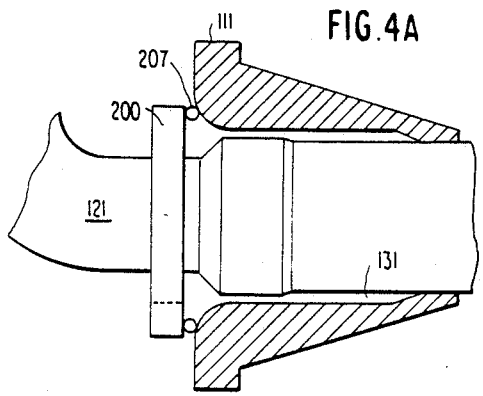
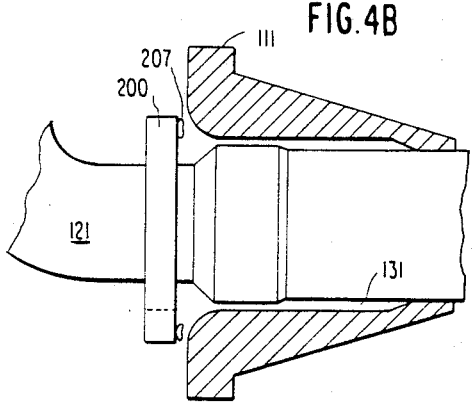

CLEANING MECHANISM FOR PENETRATION INTERFACES IN NUCLEAR PRESSURE VESSELS

BACKGROUND OF THE INVENTION

The present invention relates to a method and apparatus for cleaning sediment and fine debris that has been accumulated around ingress and egress piping within water-submerged portions of existing nuclear reactor pressure vessels. More particularly, the invention relates to a manually manipulated cleaning tool which may be temporarily clamped around submerged piping at the reactor vessel walls and operated to seal an area in which debris has collected for purposes of cleaning. Remote visual monitoring and control of the cleaning apparatus is contemplated. The method of the present invention involves the manipulation of the cleaning apparatus to a desired location, the sealing of the contaminated area and the cleaning of the area using hydraulic, pneumatic and/or mechanical operations.

The steam and power conversion system of a nuclear power plant is similar in basic design to that of a conventional steam plant and consists of a basic steam loop, auxiliary systems, and the turbine generator. In a typical configuration, water is circulated through a boiling water nuclear reactor where it is converted to steam. Steam is passed to a turbine generator where it produces electricity and is then condensed and circulated back to the boiling water reactor. The boiling water reactor comprises a reactor vessel that contains a reactor core as a heating source as well as steam separator apparatus and steam dryer apparatus that prepares the steam for delivery to the turbines. The internal apparatus of the reactor pressure vessel generally are removable for repair.

Nuclear reactor pressure vessels that are used commercially for the production of electrical power require periodic inspections as a result of legislation and regulations established by federal and state governments, as well as individual utility policies. During such inspections, the reactor is shut down and certain components that occupy the reactor pressure vessel volume are removed, including the steam dryer and moisture separator in the top portion and the fuel itself. Coolant remains in the pressure vessel as a protection against radiation, however the recirculation system generally is not operated during shut-down. A detail inspection of the physical integrity of the operating system and reactor components is conducted. In particular, inspections are made to detect damage to the operating components of the reactor vessel, including those which are at all times completely submerged in coolant during both operation and inspection. An effort also is made to identify cracks or other possible areas that may jeopardize the safe operation and/or force emergency shut down of the reactor. The inspection extends to the feedwater spargers, core spray mechanisms, water inlet nozzles and internal reactor pressure vessel components.

The standard design of nuclear reactor vessels and, in particular, their coolant circulation systems, include filtering systems which are intended to remove suspended contaminants. However, because of the path taken by the coolant within the vessel during normal operations, turbulent flow occurs as the coolant passes across or around the submerged piping and jet pump assemblies. As is well-known from fluid flow mechanics, suspended particles will tend to accumulate in areas that are not in the path of direct flow. One group of such areas that is of particular concern to the present invention involves the piping that penetrates the reactor pressure vessel, such as recirculation inlet nozzles that provide coolant to the jet pumps and recirculating coolant outlets. Typically, the penetration interfaces for piping or other equipment and the reactor pressure vessel are designed with horizontal spacing that are out of the direct flow of circulating water and provide a depository for sediment and debris.

The task of cleaning debris and sediment from these penetration areas has proven to present great difficulties. While conventional underwater vacuuming systems may be used to clean around exposed structures within the vessel, these interface areas have presented an insurmountable problem.

Concern for contamination of the pressure vessel environment and, in particular, the vessel coolant, has limited candidate cleaning apparatus to station supplied utilities, including shop air (85-100 PSIG) and shop power (120V AC).

Economic considerations also demand that the cost of any cleaning system be spread as broadly as possible. Since any given facility may have several reactor pressure vessels, the use of permanent cleaning systems for each vessel is not attractive because of the added cost.

Accordingly, it is a primary object of the present invention to provide a reactor pressure vessel cleaning and decontamination system which may be easily manipulated from a remote location to clean the interface areas between external piping and the pressure vessel walls while coolant remains within the vessel.

Another object is to provide a remotely operable and easily moveable set of tools that are designed to clean interface areas of different sizes and shapes.

Yet another object is to provide a compact, easily assembled and dissembled, and portable penetration interface cleaning apparatus that uses local plant power and air for operation. The tools may be sized and shaped, within the basic concept of the present invention, to adopt to a variety of penetration interface areas and in vessels at the same or different plant sites.

A further object is to provide a cleaning tool, which may be clamped about a pipe interfacing with a wall surface, to seal an area to be cleaned and to conduct a cleaning operation.

Still another object is to provide a method for maneuvering a tool to a particular pipe and wall interface within a nuclear reactor vessel, to seal off an area to be cleaned, and to clean the area using a variety of hydraulic, pneumatic and mechanical operations.

SUMMARY OF THE INVENTION

In accordance with the foregoing objects, the invention contemplates a reactor pressure vessel cleaning system comprising a segmented extension pole, a robotic arm attachable at one end to the pole and having a universal attachment at the other end, to which one of several different cleaning tools, particularly a penetration interface cleaning tool, may be attached. The system may operate within a coolant-filled reactor vessel from a position on a platform above the open top of the vessel. The robotic arm, which includes at least a shoulder, arm and wrist portion to which a penetration interface cleaning tool is attached, may be maneuvered to a position proximate to an interface where an ingress or egress pipe penetrates the reactor pressure vessel wall. Low-light, radiation-resistant television cameras, attached to the extension pole and the robotic arm, provide a clear view of the position of the arm as well as the penetration interface cleaning tool attached at its wrist-end.

The cleaning tool incorporates a clam shell design in which two semicircular portions, hinged together at one end, may be opened and closed. When in the open position, the tool may be maneuvered to a location surrounding a pipe at the reactor vessel wall penetration interface. The tool is then operable into a closed position in which the semicircular halves completely surround the pipe. Clamp seals, which may be a deformable material that is hydraulically or pneumatically inflatable to conform to the surface of the pipe, are engageable to securely hold the tool to the pipe. Face seals on the surface of the tool that is positioned adjacent to the vessel wall are pneumatically or hydraulically inflatable upon command. When inflated, these seals would permit the volume surrounding the vessel and pipe interface to be substantially isolated. The interface area may then be cleaned by a turbulent fluid flow which suspends the deposited debris in the fluid and enables it to be flushed out from the isolated interface volume.

In a first embodiment of the invention, the isolated volume, which initially contains the vessel coolant, is filled with air, thereby forcing coolant and suspended particles out of a discharge orifice. The coolant is then permitted to rush into the isolated volume by either deflating the face seals or spraying water into the isolated interface area through nozzles that exist in the surface of the tool adjacent to the reactor wall. The flow of water will tend to loosen the deposited particles and suspend them in the water/coolant mixture as the isolated interface area is filled.

In a further embodiment of the invention, the loosening of suspended particles may be assisted by rods and brushes that are mounted on the surface of the tool adjacent to the reactor wall and are deployable into the isolated interface area. In addition, the hydraulic cleaning operation may be conducted by a hollow deployable tape which extends into the interface area and ejects water at high pressure from a plurality of nozzles.

BRIEF DESCRIPTION OF THE DRAWINGS

FIG. 3A is an illustration of the robotic arm and one embodiment of the penetration interface cleaner tool; FIG. 3B illustrates the tool in open and closed positions.

FIGS. 4A and 4B are illustrations of the operation of the penetration interface cleaner tool during turbulent flow flushing.

DETAILED DESCRIPTION

Figure 1A:
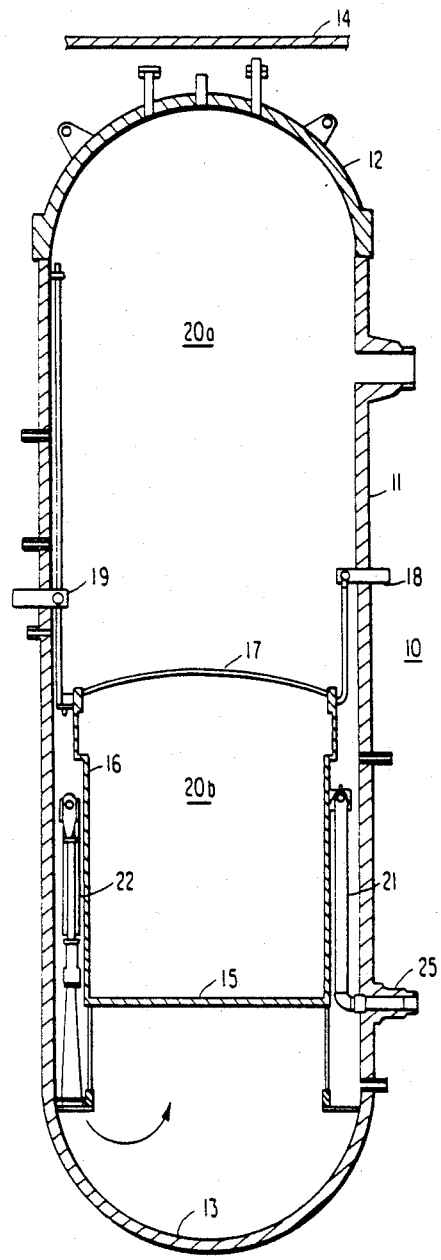
FIG. 1A is a plan view of the reactor vessel.

Referring to the drawings, FIG. 1A shows a plan view of a typical boiling water nuclear reactor pressure vessel designated generally by reference numeral 10. The vessel generally has a cylindrical shape, defined by outside walls 11, and hemispherical heads 12, 13 at the top and bottom that are sized and shaped to permit operation under high pressure conditions. The vessel top head 12 is a cap that is sealed during operation but is removable during inspection and cleaning. Located above the pressure vessel cap is a refueling bridge deck 14 which spans the diameter of the pressure vessel and permits personnel to traverse across that diameter for various operational functions, including cleaning, monitoring and repair of the vessel structure and its contents. Within the vessel upper volume 20a are located the steam separators and steam dryer assemblies (not shown) and other equipment as is well-known in the art. In the area above the core is a feed water sparger 18 and a core spray header 19, which provides emergency cooling, each of which penetrate the reactor vessel wall. Within the vessel lower volume are fuel cells (not shown) that are located within a volume 20b define by a shroud 16 having a top guide 17 and fuel support structure 15 welded to the shroud. Temperature control of the core within the volume 20 is provided by a recirculating coolant, which typically is purified water, that fills the volume 20. Circulation of the coolant contained within the reactor pressure vessel is typically provided by several jet pump assemblies that are located in two semicircular groups (designated as 1A-4A and 5B-10B in FIG. 1C) between the reactor pressure vessel wall 11 and the shroud 16. Each jet pump assembly comprises a recirculation inlet 25 which interfaces with the reactor pressure vessel wall 11 and provides coolant from a manifold fed by an external pump (not shown) to an inlet riser 21 that is connected to two jet pumps 22.

The jet pumps force water to the bottom hemisphere of the vessel as shown by the arrow in FIG. 1A. The water circulates upward through the core support 15 to cool the core. The heated water rises toward the top of the core where steam is drawn off by the steam separators (not shown) and the coolant is directed downward along the vessel walls.

The core shroud 16 acts to separate the upward flow of coolant through the core from the downward recirculation flow through the jet pumps. An outlet for the coolant is provided at the pressure vessel wall by a piping interface (not shown) that is connected to the external pump.

Figure 1C:
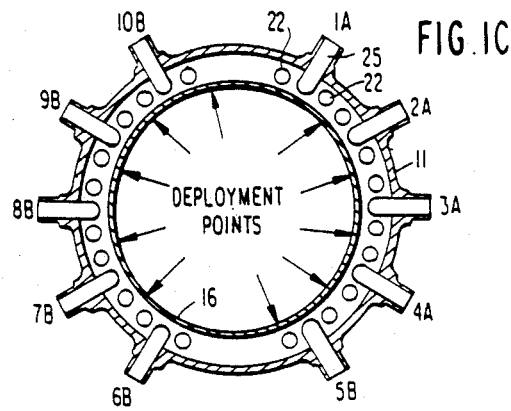
FIG. 1C is a cross sectional view of the reactor vessel.
Figure 1B:
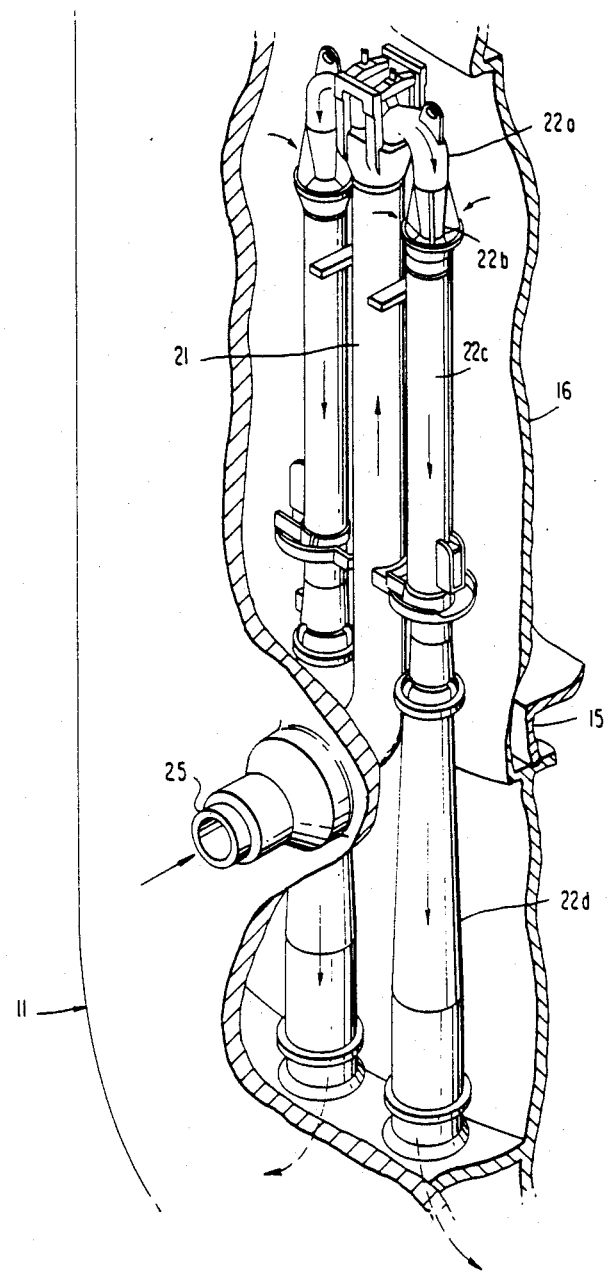
FIG. 1B is an isometric view of the reactor vessel illustrating the interface between a recirculation inlet nozzle for a jet pump and the reactor pressure vessel.

The isometric view of the reactor pressure vessel illustrated in FIG. 1B shows the detail of the jet pumps. Elements previously identified in FIG. 1A have the same numerical designation in this Figure. In operation, coolant flowing through the recirculation inlet nozzle 25 from the external manifold and pump (not shown), passes through the reactor pressure vessel wall 11 and enters a riser 21 which carries the coolant to an elevated position. At the top of the riser, the coolant is distributed to each of two inlets 22a and flows downward in a separate path to a respective nozzle 22b. The nozzle also has a suction inlet (not shown) which intakes coolant already in the vessel and located between the shroud 16 and vessel wall 11. The two volumes of coolant are combined in a mixer segment 22c and are forced to a diffuser 22d.

A cross sectional view of the reactor pressure vessel taken at the level of the recirculation inlet nozzle is shown in FIG. 1C, where previously identified elements have the same numerals. Also shown in FIG. 1C and identified with arrows are spaces between the jet pumps that serve as cleaning tool deployment points. The relevance of these locations to the present invention will be explained later.

Of particular relevance to the the present invention is the interface where the recirculation inlet nozzle penetrates the reactor pressure vessel wall, commonly called thermal sleeves. That penetration interface is illustrated schematically in FIG. 2 where the reactor pressure vessel wall 111 and the circulation inlet nozzle assembly 125 are joined. The hole formed in the reactor pressure vessel wall to accept the nozzle assembly is typically circular in shape. The nozzle assembly 125, located on the external side of the pressure vessel wall (identified as "OUTSIDE"), comprises a reinforced connection 125a which may be carbon steel ring having a stepped configuration. The nozzle assembly securely joins the input pipe to the pressure vessel wall. At the transition between the nozzle and stainless steel pipe is a stainless steel safe end. The nozzle assembly also includes a constricted nozzle 125b, that is constructed of a stainless steel material and has a gradually reduced diameter in the direction of flow. In the figure, the nozzle 125b is welded at a junction 121b to a pipe 121a which changes the direction of flow from the nozzle 125b into the riser 121. Typically, when the reactor pressure vessel and nozzle assembly are mated during construction, an annular space remains which may vary from 3/16" to 2" in a conventional design. The inlet piping is separated from the reactor pressure vessel wall by spacer pads 130 disposed about the outer circumference of the nozzle 125b at an equal spacing, e.g. approximately 120° apart for a three pad design. The areas between the nozzle 125b and the wall/connecting ring 125a, which do not contain spacers, are open. It is these areas in which radioactive sediment and debris will tend to accumulate during reactor cooling operations. Turbulence created by the ejection of coolant by the jet pump assemblies 22 will tend to carry suspended sediment and debris in the coolant. During recirculation of coolant between the reactor wall 11 and shroud 16, the coolant will flow past the opening at the wall/nozzle interface. Under well-known principles of fluid flow mechanics, the suspended material will tend to settle within those openings. In order to reduce the man-rem exposure to maintenance and operational personnel, it has been determined that removal of these particles is desirable prior to maintenance and inspection operations. Complicating the solution to this problem is the extremely small area 131 that collects these contaminants. Access to this area is limited by the narrow space that exists between the reactor pressure vessel wall 11 and the jet pump riser 121. A further difficulty, as can be seen in FIG. 1A. arises from the location of area 131 within the confined space formed by the shroud 16, and the reactor pressure vessel wall 11. Finally, ready access is prevented by the depth to which any cleaning tools or equipment must be deployed below the surface of the water, typically more than 60 ft. from the working surface of the refueling bridge deck 14. The present invention is structured to solve all of these problems.

A schematic illustration of the penetration interface cleaning assembly, including an embodiment of a cleaning tool, is illustrated in FIG. 3A. In one embodiment of the invention, a deployment pole 220 is formed of multiple hollow aluminum segments that are separable for storage and may be joined together and extended a distance sufficient to permit the penetration interface cleaning tool to be lowered from the bridge deck 14 to the level of the reactor pressure vessel interface to be cleaned. It is desirable that the pole segments be of sufficient diameter to contain electrical, hydraulic and pneumatic cabling, assembled as a harness, that connects the operative portions of the apparatus to a surface control unit located on, or proximate to the bridge deck 14. Alternatively. the cabling harness may be wound about the exterior of the pole. Although not shown, the pole segments may be provided with a buoyancy structure and may have openings that permit coolant to enter the hollow pole for radiation shielding. Attached to the pole 220 is a robotic arm 215 comprising a shoulder portion 215a, an arm portion 215b and a wrist portion 215c. The shoulder portion 215a is attached mechanically to the pole at a joint 217. The shoulder 215a is attached to the arm 215b by an elbow joint 215d and the wrist portion of the arm 215c contains a universal snap-on connecter 211. The arm may be hydraulically operated and may be of a conventional design suitable for underwater operation, such as one commercially available from Kraft Ocean Systems. Inc. and sold under the name GRIPS. TM A cabling harness 216, which is shown concealed in the pole, becomes exposed at the pole-arm connection and may be wound about the robot arm in a manner which permits free movement of the arm but reduces the threat of snagging on equipment located within the reactor pressure vessel during deployment of the cleaning apparatus. Also mounted on the pole 220 and the robotic arm are television cameras 213a, 213b, respectively, which can provide the surface operator with a full field of view of the arm and tool assembly. The cameras are adapted for low-light underwater operation in high radiation fields and also are standard off-the-shelf equipment. The cameras may be accompanied by lights (not shown). Electrical and video connections to the cameras are provided by cabling in the harness 216. Remote operation of the robotic arm, including shoulder, arm and wrist movement may be accomplished in a conventional manner.

Attached to the wrist portion 215c by the snap-on connection 211 is a penetration interface cleaner tool 200, shown in its simplest form. The tool has a clam shell shape and comprises two semicircular halves 201a, 201b which are joined by a hinge 201c at one end, proximate to the robotic arm, and are separable at the diametrically opposite end 201d. Each of the semicircular elements may be constructed of a low-carbon stainless steel and may have a generally rectangular cross section. Each element may be hollow and provide an internal volume sufficient to permit cabling, pneumatic or hydraulic manifolds and a variety of mechanical hydraulic or pneumatic cleaning apparatus to be attached thereto or deployed therein. Alternatively a U-shaped channel design can be employed with the opening at the outer circumference of each shell half. Each semicircular half 201a, 201b has attached to its external, surface proximate to the hinge 201c, a winged member 205a, 205b, respectively, which is angled away from the hinge in a direction which provides a lever advantage to the hinge when a force is applied at the distal end of the member. A double acting pneumatic cylinder 203, having dual pistons oppositely disposed and physically connected via rods 206a, 206b to the distal end of each of the respective wing members 205a, 205b by pivots 205c will control the opening and closing of the clam shell-like structure. In a contracted position, the pistons move toward a central position and exert a force on the distal end of the respective wing members 205a, 205b which pulls the lever towards the hinge, thus opening the clam shell structure by permitting rotation at the hinge 201c. Attached between the cylinder 203 and an external circumferential surface of the respective semi-circular half 201a, 206b is a compressed spring 204a, 24b which provides a mechanical force sufficient to open the clam shell-like structure should the pneumatic pressure on the pistons be released. A cross sectional view of the penetration interface cleaning tool in a partially opened position (solid line) during deployment and a closed (dotted line) position for operation may be seen in FIG. 3B. Also shown in the FIG. on the mating surface of the clam shell halves that are opposite the hinge is a pin 201e (located on shell half 210b) that mates with a hole 201f (located in shell half 201a) and assures proper alignment of the two shell halves when closed.

Figure 2:
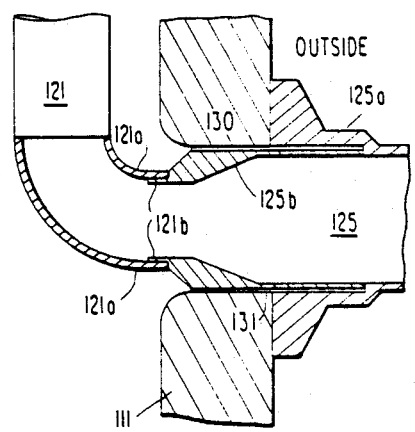
FIG. 2 is an illustration of a penetration interface, commonly called a thermal sleeve, between the reactor pressure vessel and the circulation inlet pipe.

Attached to the interior circumferential surface of each of the clam shell halves of the tool is a pliant material 210. The material acts as a clamp seal and is intended to provide a snug fit between the tool and the pipe 121a joining the riser 121, as seen in FIG. 2. This material may be a deformable plastic or rubber substance or may be a pneumatically or hydraulically inflatable bladder which, when filled, provides the snug engagement of the tool and the pipe. Where a pneumatic bladder is used, the pressure of air applied to the bladder is adjusted according to the depth of coolant in the vessel at the location that the tool will be used.

Also attached to a face of each of the clam shell portions 201a, 201b, on a surface which would abut the reactor vessel wall when the tool is in an operational and closed position, is an inflatable bladder 207 that acts as a face seal. The bladder is disposed in a manner which isolates the area surrounding the pipe and permits it to be substantially air tight and water tight. The portion of each clam shell portion diametrically opposite the hinge 201c also contains a water level float 202, which is radially located internal of the inflatable bladder 207, and at least one air nozzle 209. The clam shell halves at this end also are notched and provide an aperture 208 which remains unsealed to external coolant fluids even when the face seal bladder 207 is inflated.

When maintenance is to be conducted on the reactor pressure vessel that has been taken out of service and the reactor pressure vessel disassembled, a penetration interface cleaning operation using the above described apparatus may be conduced. Assembly of the pole section 220 is accomplished by joining together the several segments to a desired length and threading the wiring harness 216 through the hollow internal portion of the pole. The robotic arm 215 is attached to the lowest segment of the pole 220 and the cameras 213a, 213b are attached to the pole 220 and robotic arm 215 in appropriately designated positions which provide optimum view of the arm 215 and tool 200. Hydraulic cabling from the robotic arm and from the mounted television sets is connected to appropriate arm control and television monitoring equipment on the refuel bridge deck (not shown). An appropriate penetration interface cleaning tool 200. which is sized for the particular pressure vessel/piping interface to be cleaned, is attached to the wrist 215c of the robotic arm 215. Pneumatic and hydraulic lines are bundled into the cable harness 216 and are connected to the tool by conventional waterproof snap connections. In its simplest configuration, one line is connected between a control panel to the service air pressure in order to operate the pistons that control the opening and closing of the clam shell structure, a second line is connected to deliver the service air in order to selectively inflate the bladder or bladders that isolate the interface area, and third and fourth lines are connected to provide sources of air, for the sealing and cleaning operation. The first and second lines may be combined into a single line that is connected via a pressure sensitive switch that first directs air to close the clam shell and, when back pressure is detected, then inflates the clamp seal. Similarly, the third and fourth lines may be combined into a single line that is connected to a pressure sensitive switch that first inflates the face seal and then forces air into the isolated volume, once the pressure in the face seal reaches a preset level.

The operator using the deployment pole 220 and, possibly assisted by a crane, manually maneuvers the open clam shell to a position as close as possible to the reactor pressure vessel wall and the pipe interface. Typical deployment points as illustrated in FIG. 1C are between the shroud 16 and wall 11, with the tool being directed between adjacent jet pump assemblies 22, along the vessel walls 11 and positioned adjacent riser 21. The open tool is then moved with the robotic arm to a position above the inlet pipe 25. Once in that position, pressure is applied by the first line to the pneumatic actuator 203 and the piston rods 206a, 206b apply a force to the wings 205a, 205b and the clam shell portions 201a, 201b are closed around the pipe. If pneumatic seals are used, the clamp seals 210 are inflated to tightly secure the tool to the pipe.

In FIG. 4a and FIG. 4B, previously identified elements are identified by identical numbers. FIG. 4A shows that the pneumatic bladders 207a and 207b are inflated and a seal provided between the tool 200 and the reactor pressure vessel wall 111. At this point, coolant exists in the volume between the shroud 16 and the reactor pressure vessel wall 111 in the space occupied by the riser 121 as well as within the isolated volume enclosed by the pneumatic face seals 207a 207b, including the area containing the radioactive contaminants 131.

In the following step, compressed air is blown into the isolated volume through nozzle 209 and, as it rises to the top of the isolated volume, turbulence created by the rising air bubbles will cause any loose sediment to be dislocated and suspended in the coolant. As the air continues to flow into the isolated volume, coolant will be forced out at the bottom of the isolated volume through passage 208 by virtue of the increasing air pressure. When the water level within the isolated volume has been lowered to a point at which the water level float switch 202 is located, an indication is sent to the surface via an electrical line in the cable harness 216 showing that the isolated volume has been sufficiently evacuated. In the next step, as seen in FIG. 4B, the pneumatic face seals 207a, 207b are deflated while the clamp seal 210 remains inflated, thereby continuing to maintain the penetration interface cleaning tool 200 clamped about the pipe 121. Because the isolated volume is submerged at significant depth within the reactor pressure vessel, coolant will rush into the isolated volume, past the deflated face seals 207a, 207b nd create a turbulent flow within the isolated volume. This turbulent flow will further loosen contaminated particles and suspend them within the coolant as it fills the cavity. The isolated volume may again be sealed by inflating the pneumatic seals 207a, 207b and the process repeated i.e. filling the isolated volume with air, thereby forcing the coolant containing the suspended contaminated particles out through the discharge passage 208 and again deflating the pneumatic seal 207a once the float switch 202 indicates that the isolated volume has been evacuated of coolant. This turbulent flow flushing process may continue for several cycles.

Figure 5A:
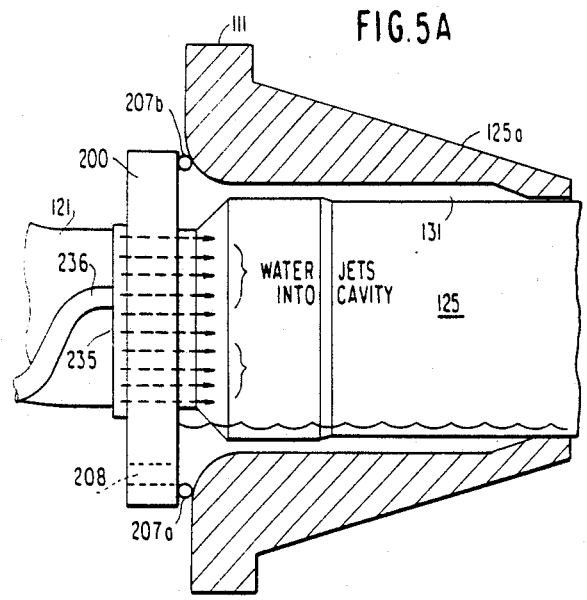
FIG. 5A is an illustration of a second embodiment of the penetration interface cleaner tool.

In a second embodiment of the invention, as shown schematically in FIG. 5A the penetration interface cleaning tool 200 may have on its surface proximate to the reactor vessel wall a plurality of hydraulic or pneumatic nozzles disposed circumferentially around each of the clam shell halves and joined to a common air or high pressure water intake 235 by a manifold 236. The nozzles would be disposed radially inwards of the pneumatic face seals 207a, 207b and at a position proximate to the opening of the interface 131. In operation, the water would be supplied to the nozzles once the isolated volume has been evacuated, thereby causing high pressure jets of water to erode any accumulated contaminants. Alternatively, where air is used, high pressure jets of air could be provided once the clamp seal 210 and pneumatic face seals 207a, 207b created the isolated volume but prior to the evacuation of coolant. The jets of air would cause turbulent movement of the coolant within the isolated volume, thereby resulting in erosion and suspension of the contaminated particles within the coolant contained in the isolated volume. During this process, as air continues to fill the isolated volume, the coolant containing the suspended contaminants may be forced out of the discharge passage 208, as previously disclosed.

Figure 5B:
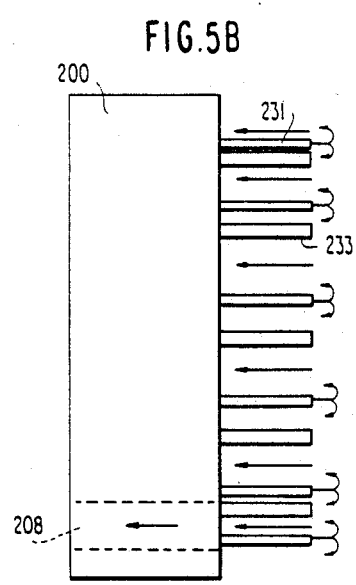
FIGS. 5B and 5C are views of the penetration interface cleaner tool of a third embodiment having brush probes and high pressure water injectors.
Figure 5C:
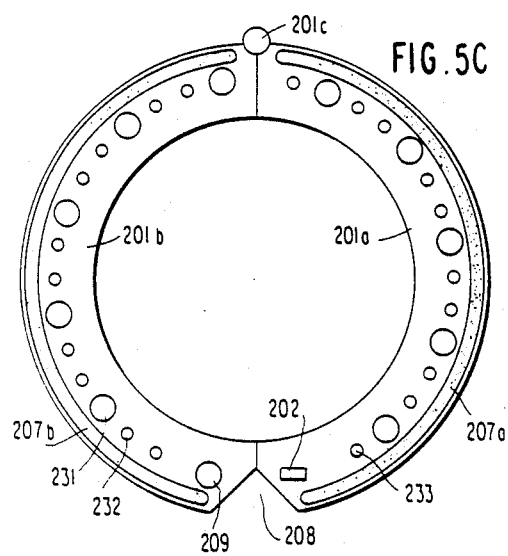

In a third embodiment of the invention, as seen in FIGS. 5B, and 5c additional mechanical and hydraulic elements may be added to the tool surface that is proximate to the reactor pressure vessel wall. As seen in FIG. 5B, high pressure water jets 231 and brush probes 233 may be operated by hydraulic or pneumatic pressure to extend from the face of the tool into the contaminated cavity area 131. The brush probe 233 may have an abrasive surface which, as the brush extends under high pressure input, penetrates any compacted contaminants and permits them to be suspended in the coolant within the isolated volume. The brush probe 233 may be used alone or in conjunction with a high pressure injector 232. The injectors 232 may accompany the probe brush 233 as it enters the contaminated area 131 and further erode the contaminants and cause them to be suspended in the coolant and water that it ejects from orifice 208, as shown by the arrows in FIG. 5B. A schematic view of the side of a penetration interface cleaner tool that is deployed proximate to the reactor pressure vessel wall and includes the face seals 207a, 207b as well as water jets 231, brush probes 233 and water injectors 232 is seen in FIG. 5C. Other elements are numbered as previously disclosed.

Figure 6A:
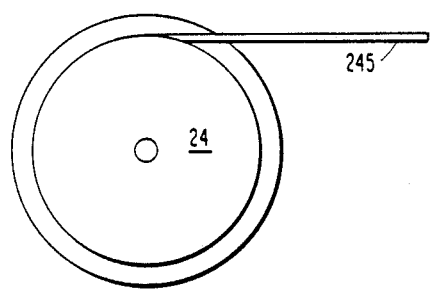
FIGS. 6A, 6B and 6C illustrate details of the extendable high pressure water injectors.
Figure 6C:
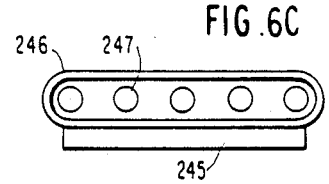
Figure 6B:
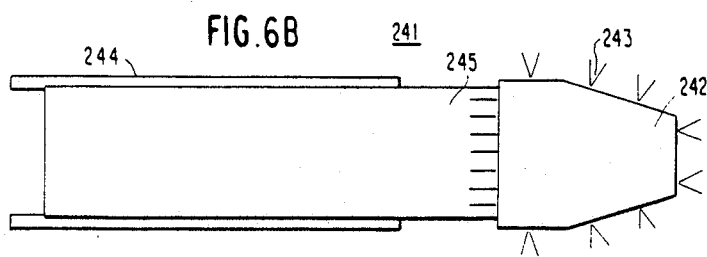

A detailed description of an extendable injector is shown for the high pressure water injector in FIGS. 6A. 6B, and 6C. Contained within the tool itself would be an injector roll 24 which may be operated under water pressure or hydraulic pressure in a manner well known in the art. Upon application of the pressure, the roll would extend linearly out from a guide in the tool surface into the contaminated cavity 131. The roll could be spring biased such that upon removal of the water pressure, it is automatically rewound within the penetration interface cleaning tool. The high-pressure water injector may be structured as shown in FIGS. 6C and comprise a steel tape 245 on which a flexible polyurethane jacket 244 is bonded. The tape contains water flow passages 247 that communicate with the nozzle 242 located at the distil end of the tape. The nozzle contains the number of exit points 243 through which high pressure water is emitted, and causes the hydraulic cleaning action. The stainless steel tape has a shape memory which permits it to return to its original wound position, with the assistance of the spring loaded roll, following removal of the water pressure.

Figure 7:
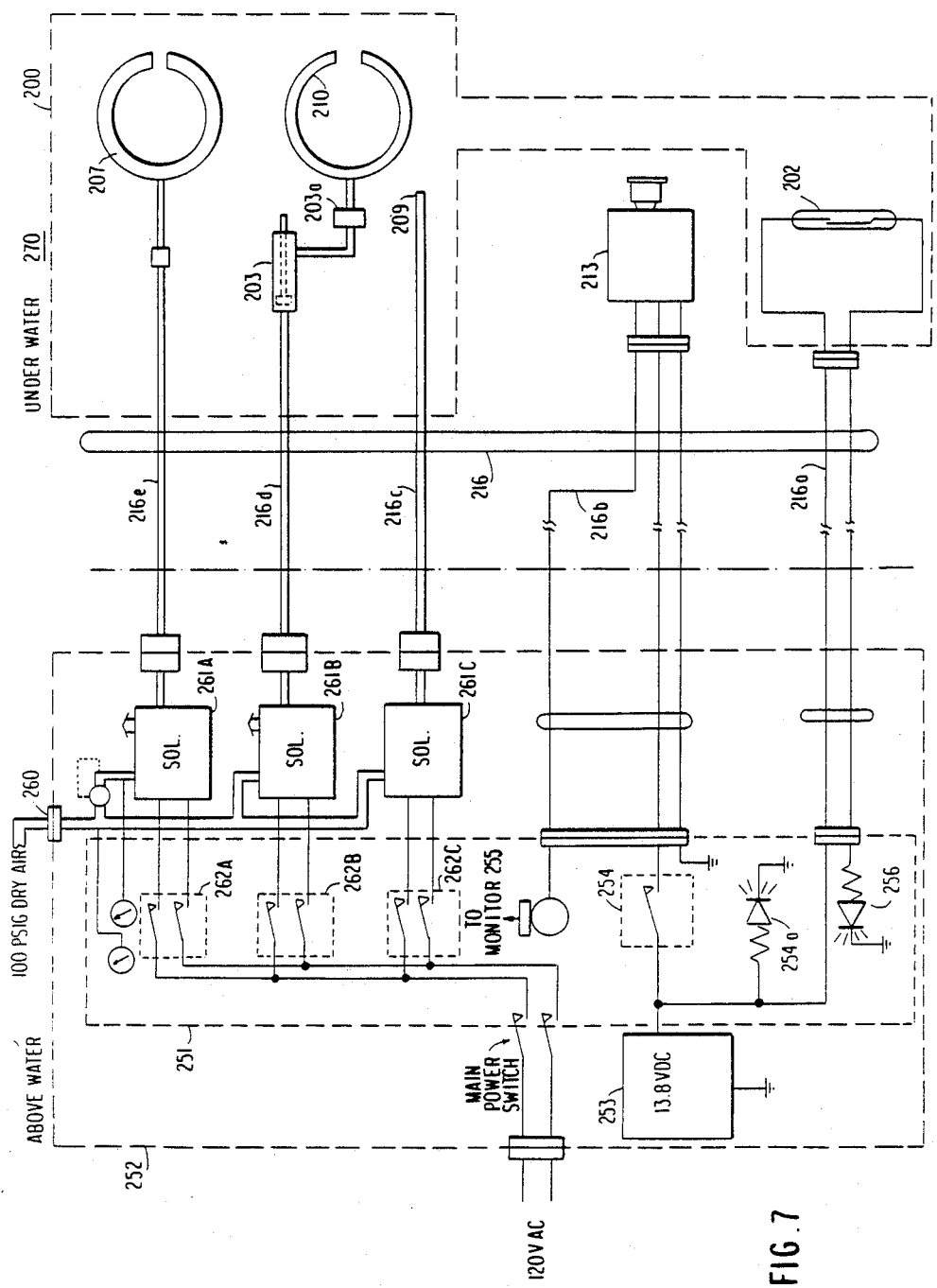
FIG. 7 is a penetration interface cleaner system block diagram in one embodiment of the invention.

An example of a manually operated penetration interface cleaning system in block diagram form is shown in FIG. 7. The system is divided into equipment located above water 250 an equipment which is located under water 270. The main elements of the above water system are a control panel 251 and equipment 252 enclosure which typically would reside on the refueling bridge deck. Underwater, and attached via the extendable segmented pole 220, would be the main components of this simplified system comprising the penetration interface cleaning tool 200, including water level sensor 202, and a camera 213 with lights for remote observation. The connection of the camera and lights via a water proof connector and cabling 216a to a switch 254 with indicator 254a and a source of power 253 and a video monitor 255 is well-known to one of ordinary skill in the art. Adoption of this system for underwater operation and the attachment of additional cameras would be well-known to one of ordinary skill. Remote operation of the robotic arm 215 from the control panel 251 via hydraulic connection through the bundled cabling 216 conventional and, since it would be well-known, is not shown. In the illustrated system, the penetration interface cleaning tool has attached to it three separate air hoses that are connected to individually controlled solenoids in the control panel above water. A first hose 216d would be used to provide air to the pneumatic cylinder 203 that operates the opening and closing of the two clam shell halves of tee tool and then, once the pressure reaches a preset level as detected by pressure sensitive switch 203a, inflates the clamp seal 210. A second hose 216e may be used to inflate the face seal 207 that is attached to the surface of the tool proximate to the reactor pressure vessel wall and, when inflated, isolates the area at the pipe interface. A third hose 216c is used to provide air into the isolated volume once the interface is sealed off. A separate electrical connection 216a between the water level sensor 202, which may be a conventionally designed reed switch sensor or a L.E.D. and light sensor combination, is separately provided to a water level indicator 256 on the control panel.

In normal operation, it s desired to use air pressure available at the nuclear reactor site which typically is 85-100 PSIG. Typically, such air is dry and uncontaminated, unlike the air produced by commercial electrical or gasoline compressors. Therefore a connection 260 to the local system is provide at the control panel and is directed to the vented solenoids 262A, 262B, 262C that control a respective air hose by a check valve. The solenoids are operated by conventional electrical switches 262A, 262B, 262C connected to a local source of power 263.

The pneumatic operation of the various components of the penetration interface cleaning tool may be replaced by hydraulic components in a manner well-known to one of ordinary skill in the art. In addition, high pressure hydraulic cleaning may be provided to the tool via a hydraulic cable connected to the control panel, which is provided with a local source of high pressure water or, itself, contains a compressor for increasing the pressure of a local water source. Additional changes and modifications to this basic system would be understood by one of ordinary skill in the art.

I claim:

1. A penetration interface cleaning tool comprising:
   a pair of clamping elements, each of said elements having first and second distil ends, an internal contoured surface, an outer surface and first and second lateral surfaces, said elements being joined by a hinge at their respective first distil ends, said second distil ends being moveable in a clam-shell fashion between an open position and a closed position in which said second distil ends are substantially abutting each other;
   a first sealing means disposed on said internal contoured surface and operative to provide a substantially tight seal when said second distil ends are at a closed position;
   a second sealing means on said first lateral surface of each of said elements, said second selling means being operative between a sealing and an unsealing position;
   clamping means disposed at said first distil end of each of said elements, proximate to said hinge, for applying a force to move said second distil ends between an open and closed position; and
   a source of air disposed on said first lateral surface and located radially inward of said second sealing means.

2. The tool of claim 1 wherein said clamping means comprises a wing structure disposed on the outer surface of each of said elements, proximate to said first distil end, a shaft pivotally mounted to a distil end of each of said wing structures and a moveable means operative to impart a force to said distil end of said wing structure.

3. The tool recited in claim 2 wherein said clamping means further comprises spring means operative to force said tool into an open position.

4. The tool recited in claim 1 further comprising a manifold in each of said elements, said manifold being disposed on said first lateral surface of said tool and having connected thereto a plurality of nozzles.

* * * * *